(12) United States Patent
Abe

(10) Patent No.: US 6,778,773 B2
(45) Date of Patent: Aug. 17, 2004

(54) VIEWING APPARATUS HAVING A PHOTOGRAPHING SYSTEM

(75) Inventor: Tetsuya Abe, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/255,589

(22) Filed: Sep. 27, 2002

(65) Prior Publication Data

US 2003/0063906 A1 Apr. 3, 2003

(30) Foreign Application Priority Data

Sep. 28, 2001 (JP) ........................................ 2001-301871

(51) Int. Cl.$^7$ .......................... G02B 7/04; G02B 13/00; G02B 3/00
(52) U.S. Cl. ........................ 396/144; 396/432; 359/407
(58) Field of Search ................................ 396/333, 432, 396/144, 332; 359/399, 407

(56) References Cited

U.S. PATENT DOCUMENTS

| | | | |
|---|---|---|---|
| 4,067,027 A | 1/1978 | Yamazaki | |
| 4,262,988 A | 4/1981 | Ishibai et al. | |
| 4,400,065 A | 8/1983 | Nagler | |
| 5,583,692 A | 12/1996 | Funatsu | |
| 5,729,390 A | 3/1998 | Abe | |
| 5,926,657 A | 7/1999 | Hasushita | |
| 6,088,053 A | 7/2000 | Hammack et al. | |
| 6,476,963 B1 * | 11/2002 | Chen | 359/412 |
| 2001/0028498 A1 | 10/2001 | Haga et al. | |

FOREIGN PATENT DOCUMENTS

| | | |
|---|---|---|
| JP | 57-79909 | 5/1982 |
| JP | 62-96919 | 5/1987 |
| JP | 5-2132 | 1/1993 |
| JP | 6-2330 | 1/1994 |
| JP | 7-8848 | 2/1995 |
| JP | 7-283978 | 10/1995 |
| JP | 2624556 | 4/1997 |
| JP | 11-248996 | 9/1999 |
| JP | 2001-281555 | 10/2001 |
| JP | 2001-311868 | 11/2001 |
| WO | 01/52531 | 7/2001 |

OTHER PUBLICATIONS

English Language Abstract of JP 11–248996.
English Language Abstract of JP 2001–311868.

* cited by examiner

Primary Examiner—Russell Adams
Assistant Examiner—Arthur A Smith
(74) Attorney, Agent, or Firm—Greenblum & Bernstein, P.L.C.

(57) ABSTRACT

A viewing apparatus includes a viewing optical system having a positive objective optical system and a positive eyepiece optical system, an image of an object formed through the positive objective optical system being viewed through the positive eyepiece optical system; a photographing optical system, provided independently from the viewing optical system, for photographing the object image viewed through the positive eyepiece optical system; a first focusing mechanism for changing an image focal point of the object image formed through the positive objective optical system of the viewing optical system; a second focusing mechanism for changing an image focal point of an object image formed through the photographing optical system; an interconnection mechanism which interconnects the first focusing mechanism with the second focusing mechanism; and a release mechanism for releasing the interconnection mechanism so that the first focusing mechanism and the second focusing mechanism can operate independently of each other.

11 Claims, 2 Drawing Sheets

VIEWING APPARATUS HAVING A PHOTOGRAPHING SYSTEM

BACKGROUND OF THE INVENTION

1. Field of the Invention

The present invention relates to a viewing apparatus which includes a viewing optical system (e.g., a viewing optical system of a telescope or a binocular) and a photographing optical system for photographing an object viewed through the viewing optical system, wherein a distant object can be viewed and recorded as image data at the same time with the viewing apparatus.

2. Description of the Prior Art

Telescopes and binoculars are known as viewing apparatuses for viewing distant objects. However, such conventional viewing apparatuses do not have a function of recording object images which are viewed therethrough. Although there have been various proposals of combining a viewing apparatus such as a telescope or a binocular with a photographing system (e.g., a camera) to achieve such an image recording function, none of these proposals are practical for ordinary users.

When viewing a distant object through a viewing apparatus such as a telescope or a binocular, the user needs to perform a focusing operation to focus the viewing apparatus on the distant object to obtain a sharp image thereof. Likewise, when taking a picture of a distant object with a camera, the user needs to perform a similar focusing operation to focus the camera on the distant object to obtain a sharp image thereof. Accordingly, in the case where the viewing apparatus is combined with the camera, only a single focusing operation needs to be performed to take a picture of the distant object if the focusing mechanism of the viewing apparatus is interconnected with the focusing mechanism of the camera. This makes it possible for the user to concentrate on performing the focusing operation of the viewing apparatus, without being bothered by the focusing operation of the camera.

However, if the focusing mechanism of the viewing apparatus is simply interconnected with the focusing mechanism of the camera, the camera cannot be sharply focused on the object to obtain a sharp image thereof since vision varies between individual users. Namely, if different users having different vision perform a focusing operation, the focal point varies between the different users. Therefore, since vision varies greatly between individuals, the focal point also varies greatly between individuals when photographing with a camera. Consequently, a sharp and in-focus picture can be difficult to be obtained depending upon the user.

SUMMARY OF THE INVENTION

The present invention provides a viewing apparatus having both a viewing optical system such as a telescope or a binocular for viewing distant objects, and a photographing system for photographing images of distant objects, wherein the photographing system can photograph sharp and in-focus images of distant objects regardless of variations in vision between individuals.

As an aspect of the invention, a viewing apparatus is provided, including a viewing optical system having a positive objective optical system and a positive eyepiece optical system, an image of an object formed through the positive objective optical system being viewed through the positive eyepiece optical system; a photographing optical system, provided independently from the viewing optical system, for photographing the object image viewed through the positive eyepiece optical system; a first focusing mechanism for changing an image focal point of the object image formed through the positive objective optical system of the viewing optical system; a second focusing mechanism for changing an image focal point of an object image formed through the photographing optical system; an interconnection mechanism which interconnects the first focusing mechanism with the second focusing mechanism, and a release mechanism for releasing the interconnection mechanism so that the first focusing mechanism and the second focusing mechanism can operate independently of each other.

With this arrangement, the focusing mechanism of the viewing optical system and the focusing mechanism of the photographing optical system, which are normally interconnected with each other, can be temporarily disengaged from each other. In this temporarily disengaged state, the diopter of the viewing optical system can be corrected to correspond to the vision of an individual user as needed.

The interconnection mechanism can incorporate the release mechanism, the first focusing mechanism can incorporate the release mechanism, or the second focusing mechanism can incorporate the release mechanism.

The viewing optical system can be a telescope optical system.

A viewing apparatus is provided, including a pair of viewing optical systems each having a positive objective optical system and a positive eyepiece optical system, an image of an object formed through the positive objective optical system being viewed through the positive eyepiece optical system; a photographing optical system, provided independently from the pair of viewing optical systems, for photographing the object image viewed through the positive eyepiece optical system; a first focusing mechanism for changing an image focal point of the object image formed through the positive objective optical system of the viewing optical system; a second focusing mechanism for changing an image focal point of an object image formed through the photographing optical system; an interconnection mechanism which interconnects the first focusing mechanism with the second focusing mechanism; and a release mechanism for releasing the interconnection mechanism so that the first focusing mechanism and the second focusing mechanism can operate independently of each other.

It is desirable for the optical axis of the photographing optical system to be provided between two optical axes of the pair of viewing optical systems.

The first focusing mechanism can include a focusing knob, and the interconnection mechanism can include a gear train for transferring rotation of the focusing knob to the second focusing mechanism.

The first focusing mechanism can further include a screw shaft which is coaxially engaged with the focusing knob, and the release mechanism can include a disengaging mechanism for temporarily disengaging the focusing knob from the screw shaft without disengaging the focusing knob from the gear train.

The present disclosure relates to subject matter contained in Japanese Patent Application No. 2001-301871 (filed on Sep. 28, 2001) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
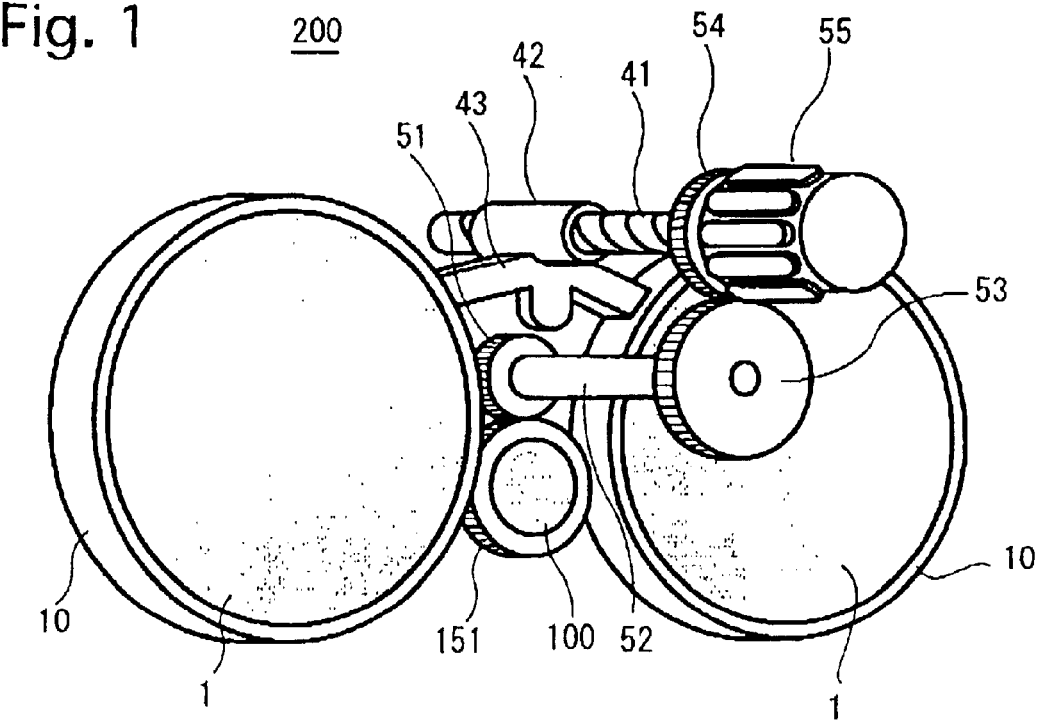
FIG. 1 is a schematic perspective view of fundamental elements of an embodiment of a viewing apparatus having a photographing system, according to the present invention.

FIG. 1 shows fundamental elements of an embodiment of a viewing apparatus having a photographing system according to the present invention. The viewing apparatus 200 is constructed as a combination of a binocular having a binocular optical system with a photographing system having a photographing optical system 100.

The binocular optical system of the viewing apparatus 200 includes a pair of viewing optical systems (a pair of refracting telescope optical systems) 1. As known in the art, each viewing optical system 1 includes a positive objective optical system having a plurality of lens elements for forming an inverted object image which is upside down and reversed from left to right, an erecting optical system (e.g., a Porro prism erecting system) for erecting the inverted object image formed by the objective optical system to a proper orientation, and a positive eyepiece optical system for viewing the erected object image inverted by the erecting optical system, in that order from the object side. In FIG. 1, only a portion of the objective optical system of each viewing optical system 1 is shown as the viewing optical system 1 for the purpose of simplicity.

The photographing optical system 100 has a positive power, and is constituted by a plurality of lens elements. As shown in FIG. 1, the photographing optical system 100 is positioned between the pair of viewing optical systems 1. In FIG. 1, only a portion of the photographing optical system 100 is shown as the photographing optical system 100 for the purpose of simplicity.

In each viewing optical system 1, a portion of the objective optical system is fixed to an objective lens frame 10. The two objective lens frames 10 are coupled to each other via an arm 43. A hollow cylindrical member 42 is fixed to top center of the arm 43. The cylindrical member 42 is provided on an inner peripheral surface thereof with a female threaded portion (not shown). A screw shaft 41 is inserted in the cylindrical member 42 so that a male threaded portion of the screw shaft 41 is engaged with the female threaded portion of the cylindrical member 42. As shown in FIG. 1, a spur gear 54 is coaxially fixed to the rear end of the screw shaft 41, while a manual focusing knob 55 is coaxially fixed to the rear face of the spur gear 54.

Rotation of the manual focusing knob 55 causes the screw shaft 41 to rotate to thereby move the cylindrical member 42 along the forward/backward direction of the viewing apparatus 200. When the cylindrical member 42 moves forward/backward in this manner, the arm 43 and the two objective lens frames 10 that are fixed to the arm 43 concurrently move along the forward/backward direction of the viewing apparatus 200. Therefore, a portion (e.g., a focusing lens group) of the objective optical system of each viewing optical system 1 moves along the optical axis thereof by rotation of the manual focusing knob 55. Accordingly, the pair of viewing optical systems 1 that serve as a binocular optical system are focused on an object by manually turning the manual focusing knob 55.

The photographing system of the viewing apparatus 200 includes the photographing optical system 100, at least one rotatable lens barrel which accommodates the photographing optical system 100, and a helicoidal thread structure (i.e., a lens barrel drive structure using helicoidal threads) for driving the rotatable lens barrel(s). The rotatable lens barrel(s) is rotated to move the photographing optical system 100 along an optical axis O thereof to bring an object into focus via the helicoidal thread structure.

The photographing optical system 100 includes a positive first lens group 101 and a positive second lens group 102 in that order from the object. The first lens group 101 is fixed to a lens frame of a photographing lens barrel 150 (see FIG. 3) of the viewing apparatus 200. The lens frame of the photographing lens barrel 150 is provided on an outer peripheral surface thereof with a spur gear portion 151 positioned about the optical axis O. The viewing apparatus 200 is provided below the screw shaft 41 with a drive shaft 52 which extends parallel to the screw shaft 41 in the forward/backward direction of the viewing apparatus 200. A front spur gear 51 which meshes with the spur gear portion 151, and a rear spur gear 53 which meshes with the spur gear 54 of the screw shaft 41 are coaxially fixed to the front and rear ends of the drive shaft 52, respectively.

Due to such a gear mechanism (gear train), a rotation of the manual focusing knob 55 causes the spur gear portion 151 to rotate via the spur gear 54, the rear spur gear 53, and the front spur gear 51. Accordingly, the photographing system of the viewing apparatus 200 is focused on an object by manually turning the manual focusing knob 55 via the aforementioned helicoidal thread structure of the photographing system. Consequently, according to the gear mechanism shown in FIG. 1, the focusing operation of the pair of viewing optical systems 1 and the focusing operation of the photographing optical system 100 are interconnected to be performed concurrently.

Figure 2A:
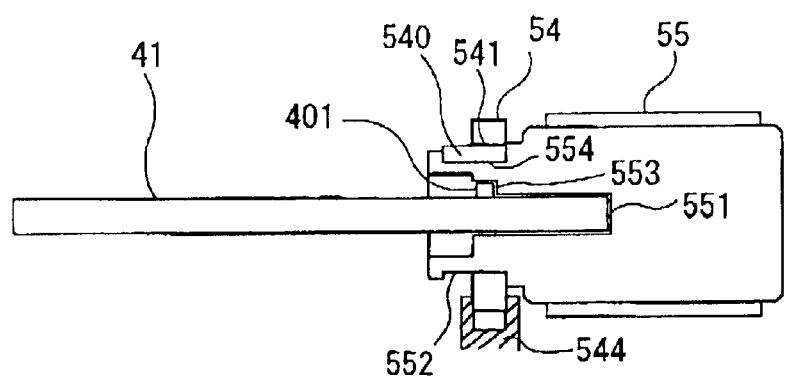
FIG. 2A is a cross sectional view of an embodiment of a release mechanism, provided in the viewing apparatus shown in FIG. 1, for releasing a interconnection between the focusing mechanism of the binocular optical system of the viewing apparatus and the focusing mechanism of the photographing optical system of the viewing apparatus, showing the release mechanism in an interconnected state.
Figure 2B:
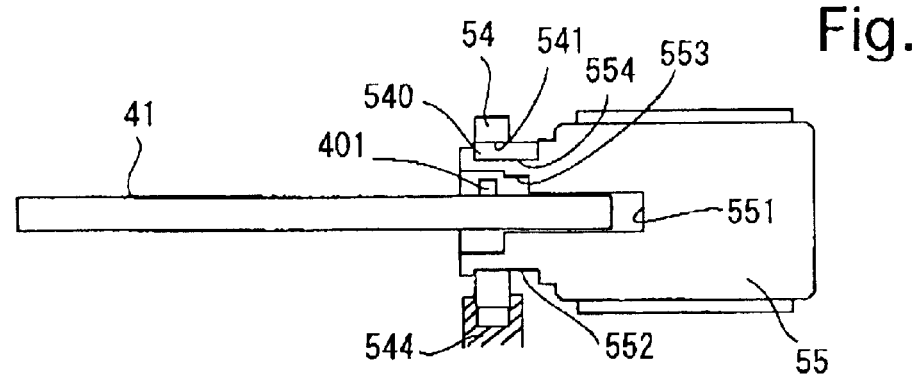
FIG. 2B is a view similar to that of FIG. 2A, showing the release mechanism in a released state.

FIGS. 2A and 2B show an embodiment of a release mechanism (focusing-mechanism-interconnection release mechanism), provided in the viewing apparatus 200, for releasing interconnection between the focusing mechanism of the binocular optical system (i.e., the focusing mechanism of the pair of viewing optical systems 1) and the focusing mechanism of the photographing optical system. FIG. 2A shows the release mechanism in an interconnected state, while FIG. 2B shows the release mechanism in a released state.

The manual focusing knob 55 is provided along the axis thereof with an insertion hole 551 in which the rear end (the right end as viewed in FIGS. 2A and 2B) of the screw shaft 41 is inserted in a manner so that the rear end of the screw shaft 41 can freely move in the insertion hole 551 along an axis thereof. The screw shaft 41 is provided, on a portion thereof positioned in the manual focusing knob 55, with a radial projection 401 fixed to the screw shaft 41, while the manual focusing knob 55 is provided, in the vicinity of the front end (the left end as viewed in FIGS. 2A and 2B) of the insertion hole 551, with a radial recess 553 in which the radial projection 401 can be engaged. In a state where the radial projection 401 is engaged in the radial recess 553, the radial projection 401 cannot rotate about the axis of the screw shaft 41 relative to the manual focusing knob 55. The screw shaft 41, the radial projection 401, the radial recess 533 and the insertion hole 551 constitute a disengaging mechanism.

The screw shaft 41 moves integrally with the spur gear 54 in a direction of rotation, and is movable in an axial direction relative to the axis of the spur gear 54. The spur gear 54 is prevented from moving in an axial direction thereof by a stationary portion 544 fixed to a body (not shown) of the viewing apparatus 200, while the spur gear 54 is fitted on an outer cylindrical surface 552 formed on the manual focusing knob 55 so that the outer cylindrical surface 552 can move relative to the spur gear 54. The manual focusing knob 55 is provided on a portion of the outer cylindrical surface 552 with a key groove 554 which extends parallel to the axis of the screw shaft 41, and the spur gear 54 is provided, on an inner peripheral surface in the central hole of the spur gear 54, with a corresponding key groove 541 which extends parallel to the axis of the screw shaft 41 so that a key 540 is inserted in between the two key grooves 541 and 554. Due to this structure, the spur gear 54 and the manual focusing knob 55 rotate together as an integral unit about the axis of the screw shaft 41, and are movable along the axis of the screw shaft 41 relative to each other.

FIG. 2A shows a state (interconnected state) where the manual focusing knob 55 is pushed forward (leftward as viewed in FIG. 2A) relative to the screw shaft 41. In this state, the radial pin 401 that radially projects from the screw shaft 41 is engaged in the radial recess 553 that is formed in the manual focusing knob 55, so that the manual focusing knob 55 and the screw shaft 41 are fixed to each other in a direction of rotation about the axis of the screw shaft 41. In addition, since the manual focusing knob 55 and the spur gear 54 are fixed to each other in the same rotational direction as mentioned above, a rotation of the manual focusing knob 55 causes the screw shaft 41 and the spur gear 54 to rotate together at the same time. Accordingly, as has been described with reference to FIG. 1, the focusing mechanism of the binocular optical system and the focusing mechanism of the photographing optical system are interconnected to be performed concurrently. In other words, in this state of FIG. 2A, a diopter adjusting device (not shown) adjusts an eyepiece optical system so that the diopter is suitable for a user's eyes. Consequently, a clear image can be seen through the viewing optical system, while the photographing optical system is not in an in-focus state.

FIG. 2B shows a state (released state) where the manual focusing knob 55 is pulled rearward (rightward as viewed in FIG. 2B) relative to the screw shaft 41. In this state, the radial pin 401 is disengaged from the radial recess 553, so that the manual focusing knob 55 and the screw shaft 41 are freed from each other in the rotational direction about the axis of the screw shaft 41. Therefore, rotation of the manual focusing knob 55 causes the spur gear 54 to rotate together at the same time, thus causing the actuation of the focusing mechanism of the photographing optical system, but does not cause the screw shaft 41 to rotate, thus not causing the actuation of the focusing mechanism of the binocular optical system. Accordingly, in the released state shown in FIG. 2B, the interconnection between the focusing mechanism of the binocular optical system and the focusing mechanism of the photographing optical system is released.

Furthermore, in accordance with FIGS. 2A and 2B, a series of operations for the diopter adjustment will be explained as follows.

1) initially, in the state of FIG. 2A, in the case where both the viewing optical system and the photographing optical system are not in an in-focus state, an eyepiece optical system (not shown) is adjusted by a diopter adjusting mechanism (not shown) so that the diopter becomes suitable for a user's eyes, while the photographing optical system is not in an in-focus state;

2) After the manual focusing knob 55 is set to the released state as shown in FIG. 2B, the photographing optical system is adjusted to an in-focus state by operating the manual focusing knob 55;

3) In order to confirm the above in-focus sate of the photographing optical system, an LCD (not shown) or a finder indicator FI (not shown) is utilized;

4) After that, the manual focusing knob 55 is again set to the interconnected state as shown in FIG. 2A, and at this state, the diopter has been suitably adjusted for the user's eyes; and 5) Hereinafter, whenever the manual focusing knob 55 is operated, a clear image can be observed, and at the same time, an image of an in-focus state can be photographed.

In the embodiment shown in FIGS. 2A and 2B, the manual focusing knob 55 can be regarded as a fundamental element of a focusing-mechanism interconnection mechanism for interconnecting the focusing mechanism of the binocular optical system with the focusing mechanism of the photographing optical system, and the focusing-mechanism interconnection mechanism can be said to have a function of temporarily releasing the interconnection. From another point of view, the manual focusing knob 55 can be regarded as a fundamental element of the focusing mechanism of the binocular optical system, and the focusing mechanism of the binocular optical system can be said to have the function of temporarily releasing the interconnection. Accordingly, the focusing-mechanism-interconnection release mechanism can be incorporated in the focusing-mechanism interconnection mechanism, the focusing mechanism of the binocular optical system or the focusing mechanism of the photographing optical system.

Figure 3:
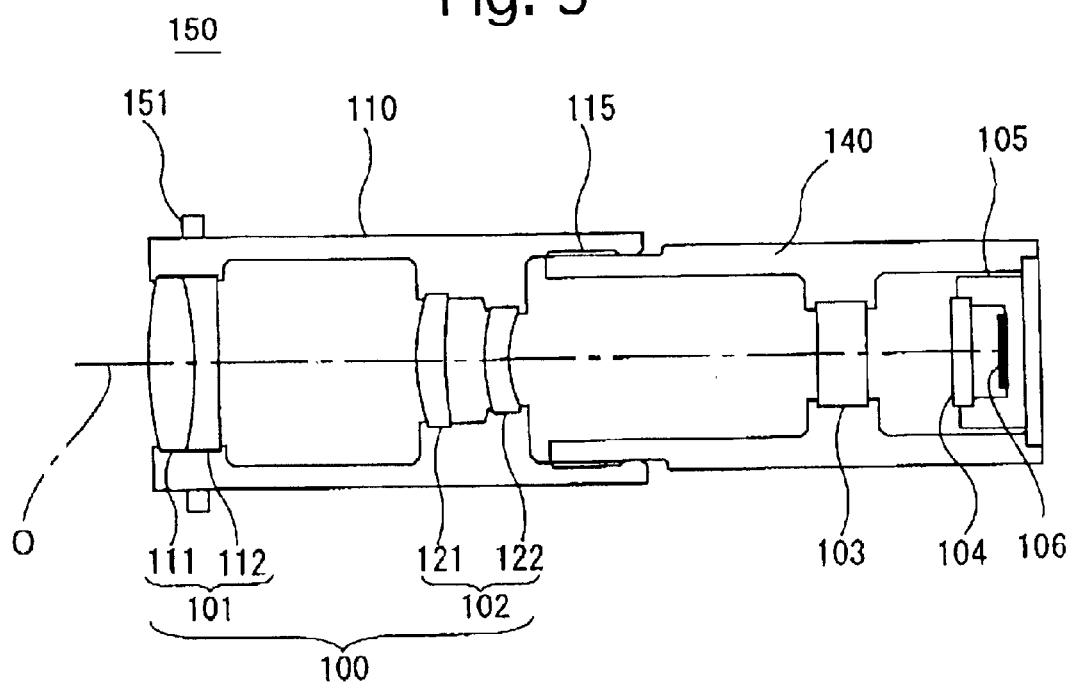
FIG. 3 is an axial cross sectional view of a first embodiment of a photographing lens barrel of the viewing apparatus shown in FIG. 1.

FIG. 3 shows a first embodiment of a photographing lens barrel 150 in which the photographing optical system 100 shown in FIG. 1 is supported. In the photographing lens barrel 150 shown in FIG. 3, the first lens group 101 of the photographing optical system 100 includes a first lens element 111 having a positive power and a second lens element 112 having a negative power. The first and second lens elements 111 and 112 are cemented to each other. The second lens group 102, which is positioned behind the first lens group 101, includes a third lens element 121 having a positive power and a fourth lens element 122 having a negative power.

The first lens element 111, the second lens element 112, the third lens element 121 and the fourth lens element 122 are arranged in that order from the object, and are supported by a movable lens frame 110. The photographing lens barrel 150 is provided therein behind the second lens group 102 with a filter 103 and a CCD package 105 in that order from the object. The CCD package 105 is provided with a CCD 106 serving as an image pick-up device, and a glass cover 104 positioned in front of the CCD 106. The filter 103 is a low-pass filter or an infrared absorbing filter. Although shown as a single filter in the drawing, the filter 103 can be more than one filter.

The photographing lens barrel 150 is provided with a fixed lens barrel 140 which accommodates and holds the filter 103 and the CCD package 105. The CCD package 105 is positioned at the rear end of the fixed lens barrel 140.

The movable lens barrel 110 is held by a fixed lens barrel 140 via a helicoidal thread structure (i.e., a lens barrel drive structure using helicoidal threads) 115. The helicoidal thread structure 115 is composed of a helicoidal male-threaded portion and a female helicoidal female-threaded portion which are engaged with each other, wherein the helicoidal male-threaded portion is formed on an outer peripheral surface of the fixed lens barrel 140 while the helicoidal female-threaded portion is formed on an inner peripheral surface of the movable lens barrel 110.

The movable lens frame 110 is provided on an outer peripheral surface thereof with the aforementioned spur gear portion 151 that is fixed to the movable lens frame 110 and positioned about the optical axis O. The spur gear portion 151 meshes with the front spur gear 51 shown in FIG. 1 to be interconnected with the focusing mechanism of the binocular optical system.

Figure 4:
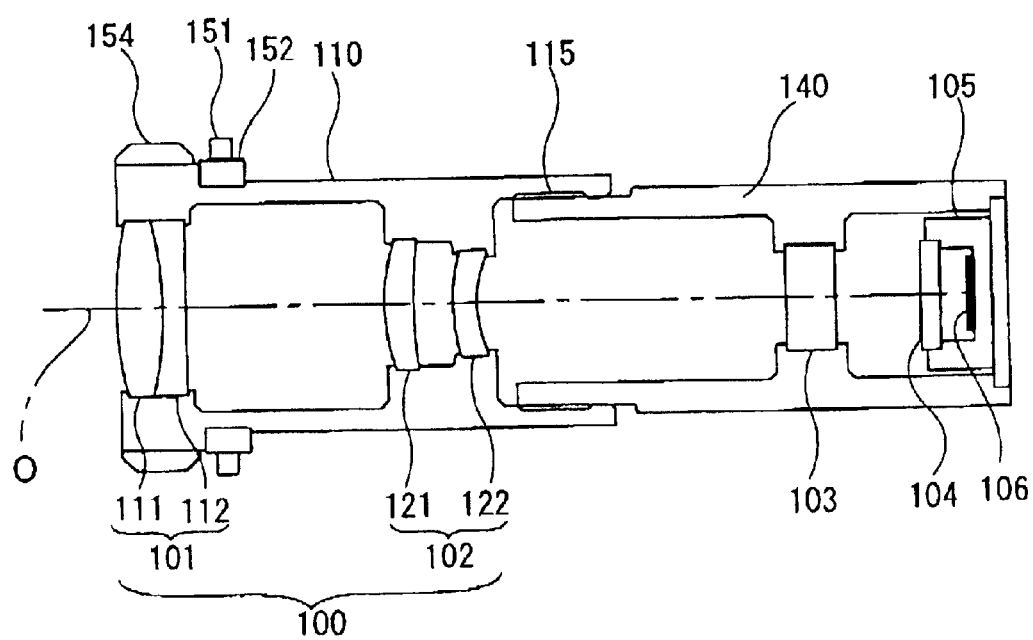
FIG. 4 is an axial cross sectional view of a second embodiment of the photographing lens barrel of the viewing apparatus shown in FIG. 1.

FIG. 4 shows a second embodiment of a photographing lens barrel 150a in which the photographing optical system 100 shown in FIG. 1 is supported. In this embodiment, the focusing-mechanism-interconnection release mechanism for interconnecting the focusing mechanism of the binocular optical system with the focusing mechanism of the photographing optical system is incorporated in the focusing mechanism of the photographing optical system.

In the photographing lens barrel 150a shown in FIG. 4, the spur gear portion 151 is not fixed to the movable lens barrel 110, but is fixed to an outer peripheral surface of a frictional ring 152. The frictional ring 152 is fitted on an outer peripheral surface of the movable lens barrel 110 in such a manner to produce moderate friction between the frictional ring 152 and the associated outer peripheral surface of the movable lens barrel 110 when rotated with respect to the movable lens barrel 110. In the photographing lens barrel 150a, the movable lens frame 110 is further provided, on an outer peripheral surface thereof at the front end of the movable lens frame 110, with a manual focus ring portion 154.

The spur gear portion 151 is in mesh with the spur gear 51 to be interconnected with the focusing mechanism of the binocular optical system shown in FIG. 1. In the case where the viewing apparatus 200 incorporates the photographing lens barrel 150a shown in FIG. 4, the viewing apparatus 200 does not incorporate the focusing-mechanism-interconnection release mechanism shown in FIGS. 2A and 2B, and the manual focusing knob 55, the screw shaft 41 and the spur gear 54 are formed as a single-piece member.

Since the frictional ring 152 is fitted on the movable lens frame 110 to be rotatable about the optical axis O relative to the movable lens frame 110 in such a manner to produce moderate friction therebetween when rotated with respect to the movable lens barrel 110, a rotation of the manual focusing knob 55 causes the spur gear portion 151, which meshes with the front spur gear 51, to rotate. This rotation of the spur gear portion 151 produces friction between the frictional ring 152 and the movable lens frame 110 to thereby rotate the movable lens frame 110 about the optical axis O relative to the fixed lens frame 140. At this time, the movable lens barrel 110 rotates about the optical axis O while moving along the optical axis O relative to the fixed lens barrel 140 due to the helicoidal thread structure 115, so that the photographing optical system 100, which includes the first and second lens groups 101 and 102, moves along the optical axis O concurrently to focus the photographing optical system on an object. Accordingly, the focusing operation of the binocular optical system and the focusing operation of the photographing optical system are interconnected to be performed concurrently.

On the other hand, manually rotating the focus ring 154 causes the movable lens frame 110 to rotate so that the focusing operation of the photographing optical system is performed via the helicoidal thread structure 115. At this time, if the spur gear portion 151 is prevented from rotating forcibly, the movable lens frame 110 idles about the optical axis O relative to the frictional ring 152. Thus, the rotation of the focus ring 154 is prevented from being transferred to the spur gear portion 151. Consequently, the focusing mechanism of the binocular optical system can be prevented from operating. Namely, the diopter of each viewing optical system 1 can be corrected to correspond to the vision of the individual user since the interconnect between the focusing mechanism of the binocular optical system and the focusing mechanism of the photographing optical system is released.

The diopter of each viewing optical system 1 can be corrected to correspond to the vision of the individual user with any known device such as a diopter correcting mechanism with which the eyepiece optical system (not shown) of each viewing optical system 1 can be moved in the optical axis thereof.

As can be understood from the foregoing, in a viewing apparatus having a photographing optical system in addition to a viewing optical system wherein only a single focusing operation needs to be performed to focus both the viewing optical system and the photographing optical system on a distant object at the same time, a sharp image of the distant object can be photographed via the photographing optical system regardless of variations in vision between individuals.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A viewing apparatus comprising:
    a viewing optical system having a positive objective optical system and a positive eyepiece optical system, an image of an object formed through said positive objective optical system being viewed through said positive eyepiece optical system;
    a photographing optical system, provided independently from said viewing optical system, for photographing said object image viewed through said positive eyepiece optical system;
    a first focusing mechanism for changing an image focal point of said object image formed through said positive objective optical system of said viewing optical system;
    a second focusing mechanism for changing an image focal point of an object image formed through said photographing optical system;
    an interconnection mechanism which interconnects said first focusing mechanism with said second focusing mechanism; and
    a release mechanism for releasing said interconnection mechanism so that said first focusing mechanism and said second focusing mechanism can operate independently of each other.

2. The viewing apparatus according to claim 1, wherein said interconnection mechanism incorporates said release mechanism.

3. The viewing apparatus according to claim 1, wherein said first focusing mechanism incorporates said release mechanism.

4. The viewing apparatus according to claim 1, wherein said second focusing mechanism incorporates said release mechanism.

5. The viewing apparatus according to claim 1, wherein said viewing optical system comprises a telescope optical system.

6. A viewing apparatus comprising:
- a pair of viewing optical systems each having a positive objective optical system and a positive eyepiece optical system, an image of an object formed through said positive objective optical system being viewed through said positive eyepiece optical system;
- a photographing optical system, provided independently from said pair of viewing optical systems, for photographing said object image viewed through said positive eyepiece optical system;
- a first focusing mechanism for changing an image focal point of said object image formed through said positive objective optical system of said pair of viewing optical systems;
- a second focusing mechanism for changing an image focal point of an object image formed through said photographing optical system;
- an interconnection mechanism which interconnects said first focusing mechanism with said second focusing mechanism; and
- a release mechanism for releasing said interconnection mechanism so that said first focusing mechanism and said second focusing mechanism can operate independently of each other.

7. The viewing apparatus according to claim 6, wherein said optical axis of said photographing optical system is provided between two optical axes of said pair of viewing optical systems.

8. The viewing apparatus according to claim 1, wherein said first focusing mechanism comprises a focusing knob, and wherein said interconnection mechanism comprises a gear train for transferring rotation of said focusing knob to said second focusing mechanism.

9. The viewing apparatus according to claim 8, wherein said first focusing mechanism further comprises a screw shaft which is coaxially engaged with said focusing knob, and wherein said release mechanism comprises a disengaging mechanism for temporarily disengaging said focusing knob from said screw shaft without disengaging said focusing knob from said gear train.

10. The viewing apparatus according to claim 6, wherein said first focusing mechanism comprises a focusing knob, and wherein said interconnection mechanism comprises a gear train for transferring rotation of said focusing knob to said second focusing mechanism.

11. The viewing apparatus according to claim 10, wherein said first focusing mechanism further comprises a screw shaft which is coaxially engaged with said focusing knob, and wherein said release mechanism comprises a disengaging mechanism for temporarily disengaging said focusing knob from said screw shaft without disengaging said focusing knob from said gear train.

* * * * *